US005937823A

United States Patent [19]
Reeder et al.

[11] Patent Number: 5,937,823

[45] Date of Patent: Aug. 17, 1999

[54] SAFELY DISABLING A LAND VEHICLE USING A SELECTIVE CALL RADIO SIGNAL

[76] Inventors: Allan Reeder, 2200 NW. 16th Way, Boynton Beach, Fla. 33426; Poh-Tin Wong, 3745 E. Sandpiper Dr., Apt. 3, Boynton Beach, Fla. 33436; William J. Burke, 11322 Woodchuck La., Boca Raton, Fla. 33428

[21] Appl. No.: 09/002,628

[22] Filed: Jan. 5, 1998

[51] Int. Cl.[6] .............................. F02P 11/04; B60R 25/10

[52] U.S. Cl. ....................... 123/335; 340/425.5; 340/426; 701/112

[58] Field of Search .................................... 123/333, 335; 340/425.5, 426, 428, 429; 701/110, 112

[56] References Cited

U.S. PATENT DOCUMENTS

| | | | |
|---|---|---|---|
| 4,345,554 | 8/1982 | Hildreth et al. | 123/335 X |
| 4,619,231 | 10/1986 | Stolar et al. | 123/335 X |
| 4,660,528 | 4/1987 | Buck | 123/335 X |
| 5,432,495 | 7/1995 | Tompkins | 340/429 |
| 5,463,372 | 10/1995 | Mawyer | 340/428 |
| 5,479,157 | 12/1995 | Suman et al. | 340/825.31 |
| 5,490,200 | 2/1996 | Snyder et al. | 379/57 |
| 5,506,562 | 4/1996 | Wiesner | 340/425.5 |
| 5,600,299 | 2/1997 | Tompkins | 340/429 |
| 5,623,245 | 4/1997 | Gilmore | 340/426 |
| 5,769,051 | 6/1998 | Bayron et al. | 123/335 |
| 5,803,043 | 9/1998 | Bayron et al. | 123/335 |

*Primary Examiner*—Tony M. Argenbright

[57] ABSTRACT

A selective call module (102), installed in a land vehicle having an engine with an ignition system (118), has a selective call receiver (104), a microprocessor (106) and a non-volatile memory (108). The selective call module is connected to an engine control module (116) of the land vehicle. The microprocessor decodes received selective call signals and causes the selective call module to enter into a shutdown state upon decoding of a shutdown page. In the shutdown state, the selective call module measures the engine speed and immediately shuts down the engine by completely turning off the ignition system if the engine speed is less than a pre-set value. The selective call module gradually shuts down the engine by interrupting the ignition system for gradually increasing durations if the engine speed is greater than the pre-set value.

15 Claims, 3 Drawing Sheets

SAFELY DISABLING A LAND VEHICLE USING A SELECTIVE CALL RADIO SIGNAL

FIELD OF THE INVENTION

This invention is directed to the field of electrical communication, and more particularly to disabling an ignition system of an internal combustion engine of a land vehicle having a selective call receiver.

BACKGROUND OF THE INVENTION

Alarms within land vehicles that signal burglary or unauthorized use are well known. When in a state to detect intrusion or unauthorized use, such alarms are typically responsive to movement, such as a door being opened, or certain operation, such as the engine being started. Such alarms typically enable a sound generating device, or a light producing device, or both. The response of some alarms is to activate a radio transmitter located within the vehicle.

U.S. Pat. No. 5,463,372 issued Oct. 31, 1995, to Mawyer, Sr., describes an anti-theft alarm with partial disablement, followed by complete shutdown of the engine of a vehicle in response to the output of a radio receiver, located within the vehicle, having been wirelessly activated by a radio signal from a remotely located transmitter. Upon occurrence of an alarm condition, an output from the anti-theft alarm of Mawyer, Sr., causes erratic operation of the ignition, thereby greatly reducing engine power but providing sufficient power so that it would be possible to get the vehicle out of traffic and to the side of a road. After a pre-determined period of time has elapsed from occurrence of the alarm condition, the anti-theft alarm completely shuts down the engine by causing the ignition to cease operating. Disadvantageously, the anti-theft alarm of Mawyer, Sr., has no provision for altering its output in response to the speed of the engine. That is, the anti-theft device of Mawyer, Sr., disables the engine at the same rate regardless of the speed of the engine. Also, if the engine is running very slowly when the radio signal is received, the anti-theft alarm of Mawyer, Sr., has no provision for immediately shutting down the engine.

Thus, what is needed is an alarm device, activated by a selective call radio signal that varies the rate disablement of a land vehicle in response to the speed of the engine of the land vehicle.

DESCRIPTION OF THE PREFERRED EMBODIMENT

Figure 1:
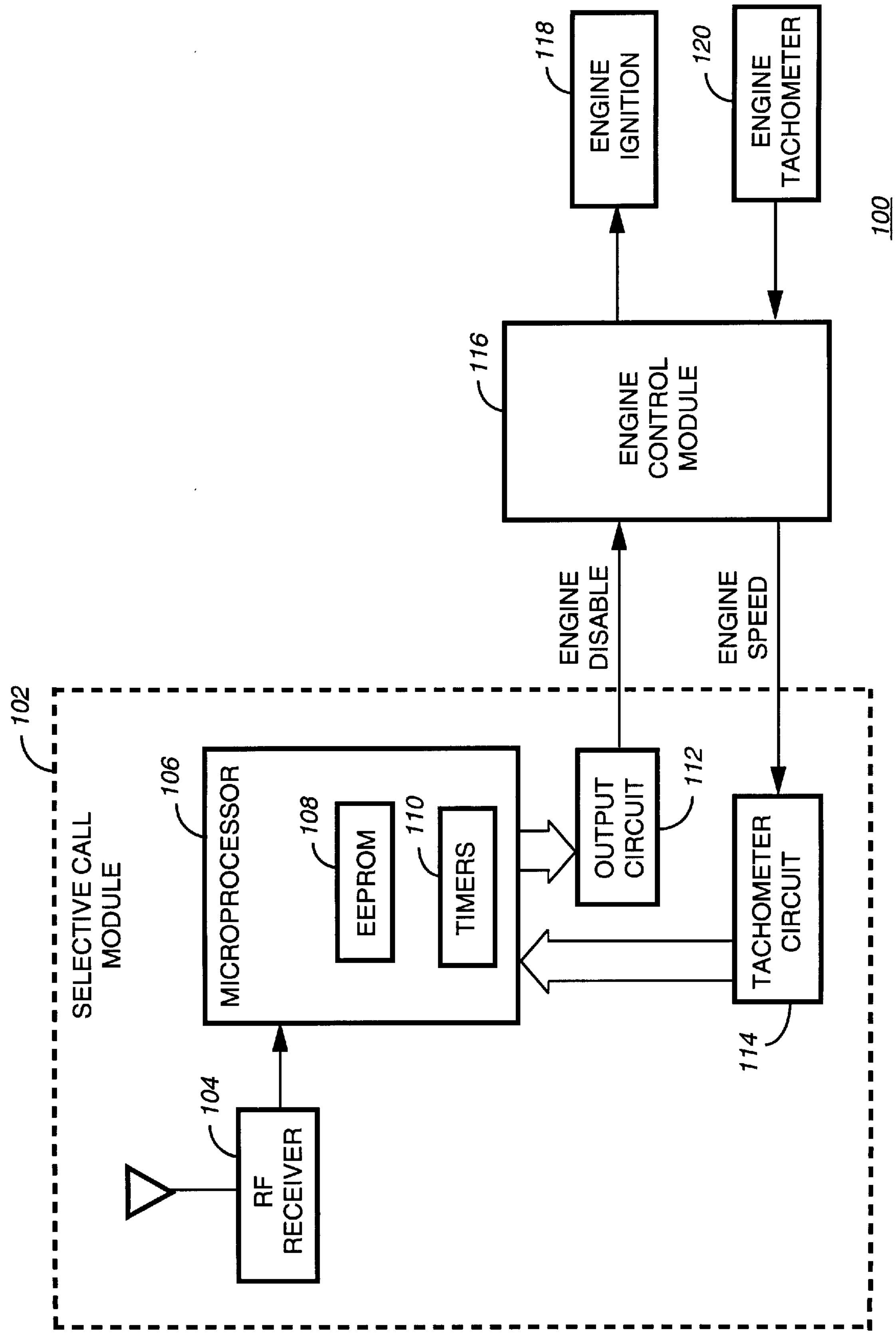
FIG. 1 is an electrical block diagram of a device in accordance with the invention.

Referring to FIG. 1, there is shown an electrical block diagram of a device 100 including a paging, or selective call, module 102, an engine control module 116, an ignition system 118 and an engine tachometer 120. Typically, the engine control module 116, the ignition system 118 and the engine tachometer 120 are conventional, pre-existing components of a land vehicle having an internal combustion engine as the propulsion power plant. The engine tachometer 120 measures the engine speed in revolutions per minute (RPM) and is coupled to the engine control module. The ignition system 118 comprises an ignition coil and spark plugs. The operation of the engine control module, the ignition system and the engine tachometer are well known to those skilled in the art. The selective call module 102 is mounted to the land vehicle and includes a radio frequency (RF) receiver 104 for wirelessly receiving selective call signals. The operation of a selective call receiver is well known to those skilled in the art. The selective call receiver, or receiver 104, is electrically coupled to a microprocessor 106 for decoding digital information encoded within the selective call signals. Demodulated signals received by the receiver 104 are decoded by the microprocessor. The microprocessor 106 includes a non-volatile memory 108, such as an electrically erasable programmable read-only memory (EEPROM), and timers 110 for timing the operation of the microprocessor. The operation of a microprocessor is well known to those skilled in the art.

The selective call module includes an output circuit 112 and a tachometer circuit 114. The output circuit 112 is electrically coupled to an eight-bit output port of the microprocessor 106. The tachometer circuit 114 is electrically coupled to an eight-bit input port of the microprocessor, preferably port PA7, the pulse accumulator. The output circuit 112 includes eight configurable solid state switches. Each switch is separately controlled by the microprocessor. Each switch has a separate output that provides either a positive voltage or a ground path. The output of some of the switches can be used with alarm-related enunciator devices such as a light or a horn. In accordance with the preferred embodiment of the invention, an output of one of the solid-state switches is electrically coupled to the engine control module 116 of a land vehicle. Typically, the engine control module 116 has at least one available pre-existing input terminal that can be used to enable or disable the operation of the ignition system 118, depending upon the voltage applied to such input terminal. The value of the output voltage at the switch of the output circuit 112 is selected to electrically match the input voltage required at the pre-existing engine control module required to enable or disable the ignition system 118. Alternatively, the switch of the output circuit is selected to provide a ground path, if grounding the pre-existing engine control module is required to enable or disable the ignition system 118.

In accordance with the invention, the receiver receives a shutdown page typically initiated by the owner of a vehicle after theft or unauthorized use of the vehicle. Upon decoding of a received selective call signal as a shutdown page, the microprocessor changes a one-bit flag in the non-volatile memory, thereby setting the non-volatile memory to a shutdown state. It should be understood that there is stored in the non-volatile memory a set of instructions for execution by the microprocessor in accordance with the invention, but only upon the changing of the one-bit flag to the shutdown value. As a result of the flag change, the microprocessor executes shutdown procedures in accordance with the invention. Advantageously, the selective call module 102 remains in the shutdown state even after the electrical power supply to the selective call module is interrupted. The selective call module resumes the shutdown procedures upon the restoration of electrical power. Advantageously, based upon the speed of the engine, the selective call module will execute either an abrupt shutdown of the ignition system, or a gradual shutdown of the ignition system.

The tachometer circuit 114 is connected via an engine speed line to an output terminal of the engine control module 116. Typically, the tachometer circuit 114 converts an approximately twelve volt square-wave signal from the output terminal of the engine control module 116 to a five volt pulse signal fed into the input port of the microprocessor 106. In addition to voltage level translation, the tachometer circuit performs impedance matching between an output terminal of the engine control module 116 and the input port of the microprocessor 106. The output circuit 112 converts a signal comprising five volt pulses originating from the microprocessor to a signal comprising a constant voltage, typically twelve volts. In should be understood that there are many types of engine control modules, and that the output circuit 112 functions as either a current sink or as a current source, depending upon the type of engine control module 116 pre-existing in the land vehicle.

Figure 2:
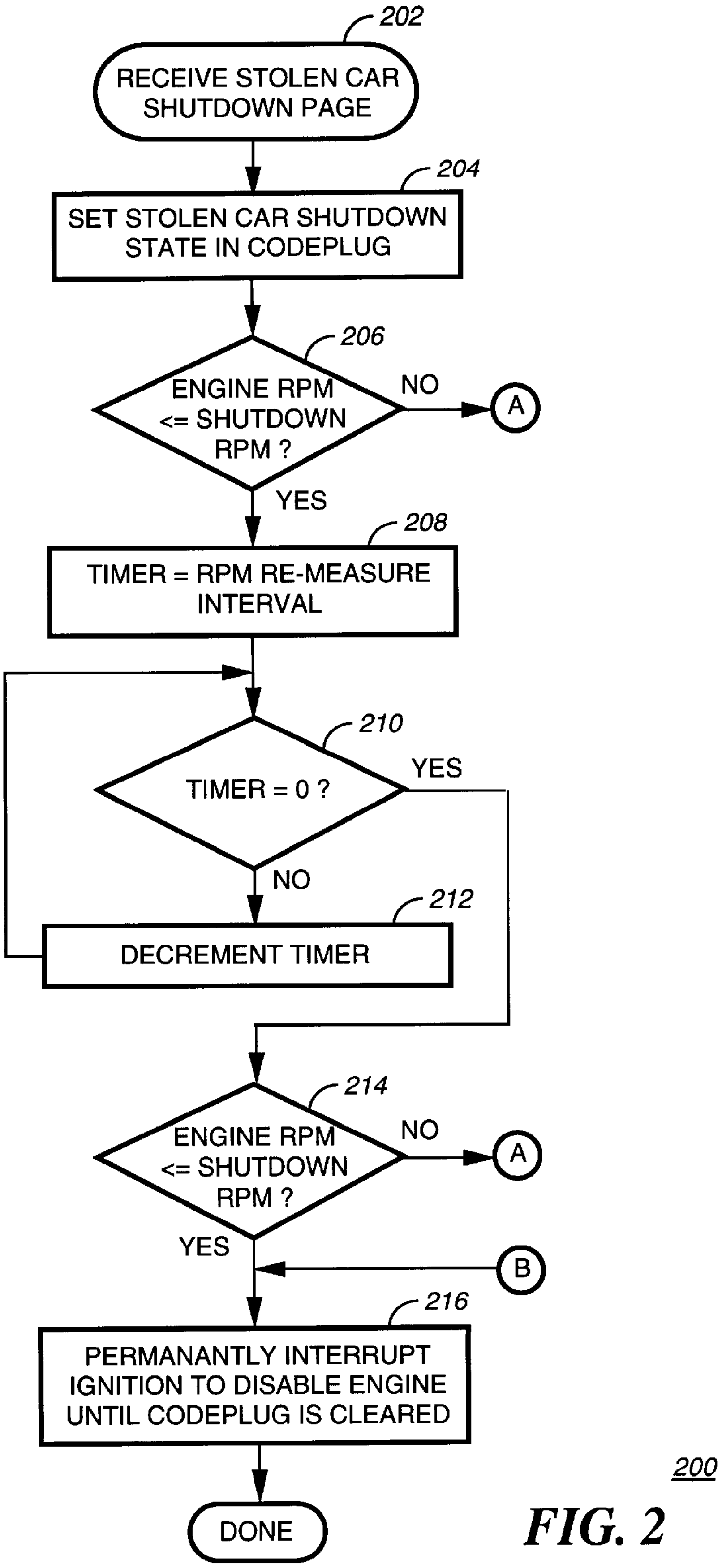
FIG. 2 is a flow diagram of a method in accordance with the invention.

Referring now to FIG. 2, there is shown a flow diagram 200 of a method in accordance with the invention. At step 202, the selective call receiver 104 receives a stolen car page shutdown page. After the microprocessor 106 decodes the received page as a stolen car shutdown page, the microprocessor sets the state of the non-volatile memory, or codeplug, to the shutdown state, step 204. At step 206, a reading of the tachometer is compared with a relatively low, pre-set tachometer reading, the shutdown RPM. Shutdown_RPM= idle_RPM+(idle_RPM/64*shutdown_factor). The shutdown factor is user selectable, with a percentage range of 1.5%–30%, in 1.5% steps. The selected percentage is divided by 1.5 and then stored, but other percentages are possible. Preferably, the selected percentage is 19.5%, stored in the codeplug. It should be understood that the speed of the land vehicle is proportional to the tachometer reading, and that the relatively low, pre-set shutdown RPM occurs at a relatively slow, pre-set speed. If the speed of the engine is less than or equal to the pre-set speed, a timer is initiated at step 208. The value of the timer is read at step 210, and the value of the timer is decremented at step 212. After lapse of a pre-determined RPM re-measure interval, timer=0, and the speed of the engine is again compared with the pre-set speed at step 214. Preferably, the pre-determined RPM re-measure interval is ten seconds. However, the RPM re-measure interval is user selectable in the codeplug, with a range of 1–32 seconds, in one second steps. If the speed of the engine is less than or equal to the pre-set speed, the microprocessor 106 causes the output circuit 112 to produce a voltage level at an input terminal of the engine control module 116, thereby causing the ignition system 118 to be permanently disabled, until the shutdown state of the code plug is cleared by another special paging signal. Advantageously, the land vehicle is quickly disabled because the method in accordance with the invention determined that the engine was operating at a relatively low RPM, meaning the land vehicle was moving relatively slowly, thereby permitting a total shutdown of the ignition system without unduly jeopardizing safety.

Figure 3:
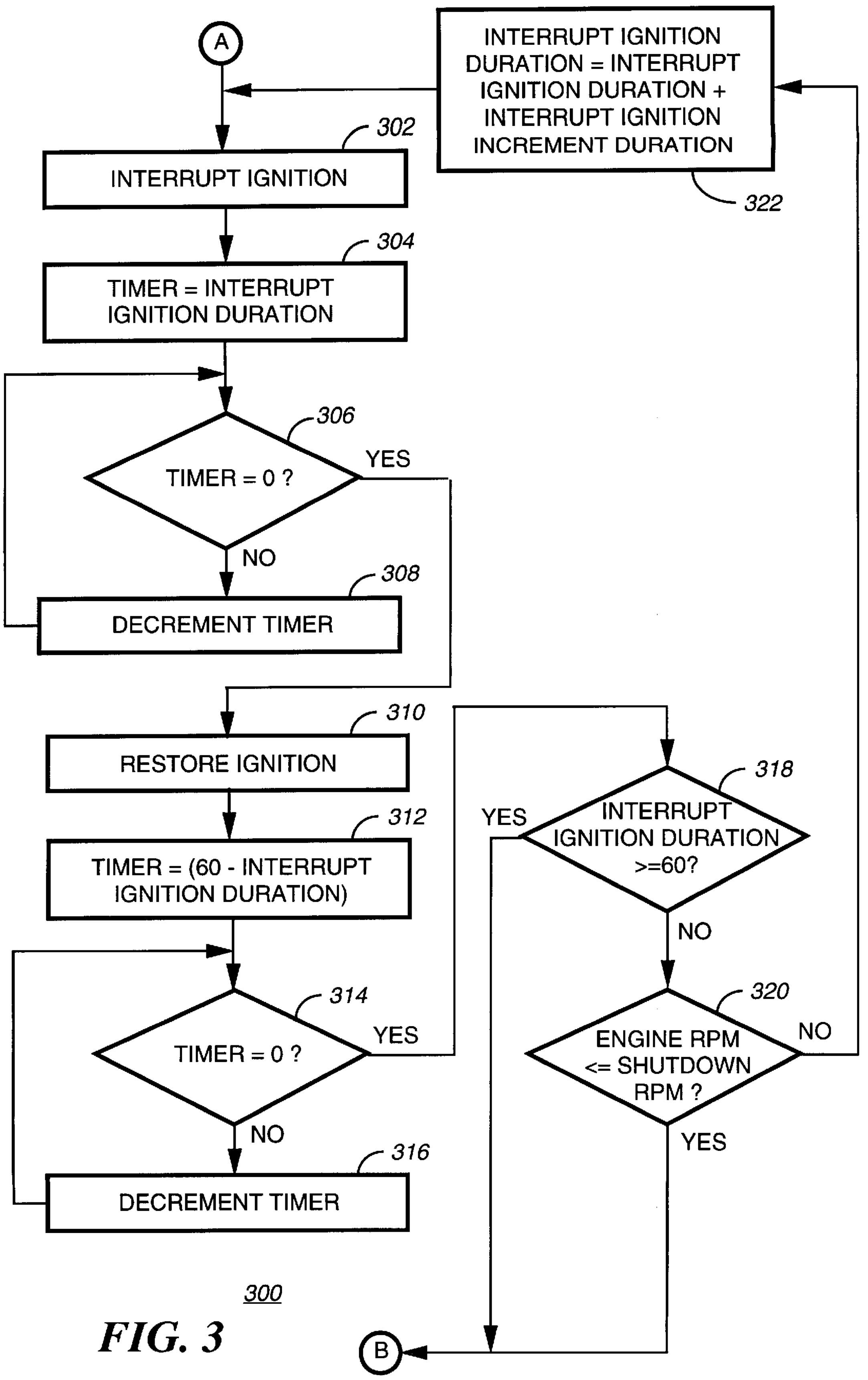
FIG. 3 is another flow diagram of a method in accordance with the invention.

Referring now to FIG. 3, there is shown another flow diagram 300 of a method in accordance with the invention. In the event the speed of the engine is not less than or equal to the pre-set speed (step 206 of FIG. 2), the method in accordance with the invention interrupts the ignition, step 302. That is, the microprocessor 106 causes the output circuit 112 to produce a voltage level on the engine disable line connected to an input terminal of the engine control module, thereby temporarily shutting off the ignition system. At step 304 a timer is set to an initial, pre-selected interrupt ignition duration. Preferably, an initial interrupt ignition duration is ten seconds. However, the initial interrupt ignition duration is user pre-selectable in the codeplug, with a range of 1–60 seconds, in one second steps. At step 306, the value of the timer is checked. At step 308, the timer is decremented. Upon the expiration of the interrupt ignition duration (timer=0), the ignition is restored at step 310. At step 312, a second timer is set to a pre-selected restore ignition duration. The restore ignition duration is equal to a fixed period minus the interrupt ignition duration. Preferably, the fixed period is sixty seconds. At step 314, the value of the second timer is checked. At step 316, the second timer is decremented. Upon the expiration of the restore ignition duration (second timer=0), the value of the interrupt ignition duration is checked at step 318. If the value of the interrupt ignition duration is greater than or equal to sixty seconds, the method proceeds to step 216 of FIG. 2, and the engine is permanently disabled until the codeplug is cleared. If the value of the interrupt ignition duration is not greater than or equal to sixty seconds, the method proceeds to step 320, where the engine speed is compared to a pre-set speed of the engine, the shutdown RPM. If the engine speed is less than or equal to the shutdown RPM, then the method proceeds to step 216 of FIG. 2, and the engine is permanently disabled until the codeplug is cleared. If the engine speed is not less than or equal to the shutdown RPM, then the method proceeds to step 322 where the interrupt ignition duration is incremented by an interrupt ignition increment duration. Preferably, the interrupt ignition increment duration is five seconds. However, the ignition interrupt increment duration is user selectable in the codeplug, with a range of 1–32 seconds, in one second steps. The method then proceeds again to step 302 where the ignition system is temporarily shutdown for preferably fifteen seconds. By shutting down the ignition system for gradually increasing periods of time, the speed of the land vehicle is advantageously reduced gradually, not abruptly.

Although the invention has been described in terms of a preferred embodiment, it will be obvious to those skilled in the art that many alterations and variations may be made without departing from the invention. Accordingly, it is intended that all such alterations and variations be considered as within the spirit and scope of the invention as defined by the appended claims. For example, the invention is equally applicable to a land vehicle having an electric motor, instead of an internal combustion engine, as a propulsion power plant, in which case, the invention intermittently applies electricity to the motor in response to occurrence of an alarm condition. The invention is equally applicable to vehicles other than land vehicles, such as water vehicles.

We claim:

1. A device for disabling a land vehicle having an engine with an ignition system, comprising:

a tachometer connected to the engine; and a selective call module electrically coupled to the tachometer and to the ignition system, the selective call module including a radio receiver for receiving a selective call signal, and a microprocessor electrically coupled to the radio receiver, the microprocessor programmed to control the ignition system in response to the selective call signal and in response to a reading of the tachometer.

2. The device of claim 1 in which the microprocessor causes the ignition system to cease operation upon occurrence of a pre-set tachometer reading.

3. The device of claim 1 in which the microprocessor causes the ignition system to cease operation upon two occurrences of a pre-set tachometer reading, the two occurrences spaced apart in time a pre-determined RPM re-measure interval.

4. The device of claim 1 in which the microprocessor causes intermittent operation of the ignition system by gradually increasing interrupt ignition durations.

5. The device of claim 4 in which the microprocessor causes the ignition system to cease operation upon occurrence of a relatively low, pre-set tachometer reading.

6. The device of claim 4 in which the microprocessor causes the ignition system to temporarily cease operation during a pre-selected interrupt ignition duration.

7. The device of claim 1, in which the selective call module includes a non-volatile memory and in which the selective call module enters into a shutdown state upon receiving a selective call signal.

8. A method of disabling an ignition system of an engine in a vehicle, comprising the steps of:

wirelessly receiving at the vehicle a selective call radio signal;

decoding the selective call radio signal as a shutdown page;

setting a non-volatile memory in the vehicle to a shutdown state;

measuring speed of the engine;

comparing a speed of the engine to a pre-set speed; and disabling the ignition system if the speed of the engine is less than the pre-set speed, until the non-volatile memory is re-set away from the shutdown state.

9. A method of disabling an ignition system of an engine in response to wirelessly receiving a shutdown page by a selective call module, comprising the steps of:

(a) pre-selecting an interrupt ignition duration and a restore ignition duration to initial values;

(b) disabling the ignition system for the interrupt ignition duration;

(c) enabling the ignition system for the restore ignition duration;

(d) measuring speed of the engine;

(e) comparing a speed of the engine to a pre-set speed; and (f) disabling the ignition system if the speed of the engine is less than the pre-set speed.

10. The method of claim 9, including, after step (f), the steps of:

(g) increasing the interrupt ignition duration for an incremental amount of time;

(h) decreasing the restore ignition duration for the incremental amount of time; and (i) repeating steps (b) through (h) until the ignition system is disabled.

11. A method of disabling an ignition system of an engine, comprising the steps of:

wirelessly receiving a selective call signal;

setting a non-volatile memory to a shutdown state;

measuring a first speed of the engine;

comparing the first speed of the engine to a pre-set speed;

in response to the first speed of the engine being less than the pre-set speed, re-measuring a second speed of the engine a pre-determined period after measuring the first speed;

re-comparing a second speed of the engine to the pre-set speed; and in response to the second speed of the engine being less than the pre-set speed, disabling the ignition system until the non-volatile memory is re-set from the shutdown state.

12. A selective call module, comprising:

a radio receiver; and a microprocessor electrically coupled to the radio receiver, programmed to gradually disable an ignition system of an engine upon decoding of a shutdown page received by the radio receiver.

13. The selective call module of claim 12, in which the microprocessor gradually disables the ignition system of the engine by alternately turning off the ignition system for gradually increasing periods of time and turning on the ignition system for gradually decreasing periods of time, in response to speed of the engine.

14. The selective call module of claim 12, including a non-volatile memory electrically coupled to the microprocessor, and in which the non-volatile memory is set to a shutdown state upon decoding of the shutdown page.

15. The selective call module of claim 14, in which the microprocessor gradually disables the ignition system of the engine by alternately turning off the ignition system for gradually increasing periods of time and turning on the ignition system for gradually decreasing periods of time, in response to speed of the engine.

* * * * *